(12) United States Patent
Tadesse et al.

(10) Patent No.: US 11,586,520 B2
(45) Date of Patent: Feb. 21, 2023

(54) AUTOMATED DATA LINKAGES ACROSS DATASETS

(71) Applicant: International Business Machines Corporation, Armonk, NY (US)

(72) Inventors: Girmaw Abebe Tadesse, Nairobi (KE); Celia Cintas, Nairobi (KE); Skyler Speakman, Nairobi (KE); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 16/924,365

(22) Filed: Jul. 9, 2020

(65) Prior Publication Data
US 2022/0012151 A1     Jan. 13, 2022

(51) Int. Cl.
*G06F 11/34*     (2006.01)
*G06F 11/32*     (2006.01)
(Continued)

(52) U.S. Cl.
CPC ........ *G06F 11/3409* (2013.01); *G06F 11/323* (2013.01); *G06F 16/2237* (2019.01); *G06F 16/288* (2019.01); *G06F 16/9024* (2019.01)

(58) Field of Classification Search
None
See application file for complete search history.

(56) References Cited

U.S. PATENT DOCUMENTS

| 9,576,248 | B2 | 2/2017 | Hurwitz |
| 10,191,998 | B1 * | 1/2019 | Burkhardt ........... G06F 16/2379 |

(Continued)

FOREIGN PATENT DOCUMENTS

| CN | 110096491 A | 8/2019 |
| CN | 110866625 A | 3/2020 |
| WO | 2022009013 A1 | 1/2022 |

OTHER PUBLICATIONS

International Search Report and Written Opinion, International Application No. PCT/IB2021/055613, International Filing Date Jun. 24, 2021.

(Continued)

*Primary Examiner* — Craig C Dorais
(74) *Attorney, Agent, or Firm* — Aaron N. Pontikos; Jared L. Montanaro

(57) ABSTRACT

Embodiments of the present invention provide a computer system, a computer program product, and a method that comprises generating a baseline prediction for each database in a plurality of databases, wherein the generated baseline prediction includes datapoints for each performance feature of a respective database in the plurality of databases; generating a linkage matrix using a dimension reduction algorithm in an equal-dimensional feature space based on a measured difference between actual performance datapoints of each respective database and respective datapoints associated with generated baseline prediction for each database in the plurality of databases; linking one or more databases in the plurality of databases based on the measured difference within the generated linkage matrix reaching a predetermined threshold of measured performance; and generating a design using the linked databases for a computer system capable of being displayed through a user interface.

20 Claims, 12 Drawing Sheets

(51) Int. Cl.
*G06F 16/901* (2019.01)
*G06F 16/22* (2019.01)
*G06F 16/28* (2019.01)

(56) References Cited

U.S. PATENT DOCUMENTS

| | | | | |
|---|---|---|---|---|
| 10,509,695 | B1* | 12/2019 | Averbuch | G06N 20/00 |
| 2016/0019185 | A1 | 1/2016 | Zatylny | |
| 2018/0203917 | A1 | 7/2018 | Marshall | |
| 2018/0360391 | A1 | 12/2018 | Ou | |
| 2018/0365337 | A1 | 12/2018 | Sexton | |
| 2019/0171642 | A1* | 6/2019 | Zhang | G06F 16/288 |
| 2019/0286539 | A1 | 9/2019 | Gerossie, Jr. | |
| 2019/0303459 | A1 | 10/2019 | Yan | |
| 2020/0104392 | A1* | 4/2020 | Hong | G06F 11/3409 |

OTHER PUBLICATIONS

"Performance Monitoring for Action", PMA Data, Printed Jun. 29, 20, 1 page, <https://www.pmadata.org/>.

"The DHS Program—Quality information to plan, monitor and improve population health, and nutrition programs", Printed May 20, 20, 4 pages, <https://dhsprogram.com/>.

Ali et al., "Administrative Data Linkage in Brazil: Potentials for Health Technology Assessment", frontiers in Pharmacy, published: Sep. 23, 2019, 20 pages, <https://doi.org/10.3389/fphar.2019.00984>.

Antoniou et al., "Data Augmentation Generative Adversarial Networks", arXiv:1711.04340v3 [stat.ML] Mar. 21, 2018, 14 pages.

Bhattacharjee et al., "P2L: Predicting Transfer Learning for Images and Semantic Relations", 10 pages, arXiv:1908.07630v1 [cs.LG] Aug. 20, 2019.

Bhowmik et al., "Frequency Domain Predictive Modelling with Aggregated Data", Proceedings of the 20th International Conference on Artifi-cial Intelligence and Statistics (AISTATS) 2017, JMLR: W&CP vol. 54. Copyright 2017 by the author(s), 10 pages.

Boratto et al., "Exploring Hybrid Parallel Systems for Probabilistic Record Linkage", The Journal of Supercomputing, Printed May 20, 20, 12 pages.

Dey et al., "A Distance-Based Approach to Entity Reconciliation in Heterogeneous Databases", IEEE Transactions on Knowledge and Data Engineering, vol. 14, No. 3, May/Jun. 2002, © 2002 IEEE, 16 pages.

Doan et al., "Principles of Data Integration", Guide books, Jul. 2012, 9 pages, <https://dl.acm.org/doi/book/10.5555/2401764>.

Douzas et al., "Effective data generation for imbalanced learning using conditional generative adversarial networks", Accepted Sep. 11, 2017, © 2017 Elsevier Ltd. All rights reserved, 9 pages, <http://dx.doi.org/10.1016/j.eswa.2017.09.030>.

Enriquez et al., "Entity Identity Reconciliation based Big Data Federation—A MDE approach", 24th International Conference on Information Systems Development (ISD2015 HARBIN), 12 pages.

Fei-Fei et al., "One-Shot Learning of Object Categories", IEEE Transactions on Pattern Analysis and Machine Intelligence, vol. 28, No. 4, Apr. 2006, 18 pages.

Guo et al., "A New Benchmark for Evaluation of Cross-Domain Few-Shot Learning", arXiv:1912.07200v1 [cs.CV] Dec. 16, 2019, 11 pages.

Jurczyk et al., "Fine-Grained Record Integration and Linkage Tool", Received May 9, 2008; Revised Aug. 8, 2008; Accepted Aug. 26, 2008, © 2008 Wiley-Liss, Inc., Birth Defects Research (Part A) 82:822-829 (2008), 8 pages.

Kasai et al., "Low-resource Deep Entity Resolution with Transfer and Active Learning", arXiv:1906.08042v1, [cs.DB], Jun. 17, 2019, 11 pages.

Kim et al., "Learning to Discover Cross-Domain Relations with Generative Adversarial Networks", May 15, 2017, 10 pages, arXiv:1703.05192v2 [cs.CV].

Konda et al., "Magellan: Toward Building Entity Matching Management Systems", Proceedings of the VLDB Endowment, vol. 9, No. 12, Copyright 2016 VLDB Endowment 2150-8097/16/08, 12 pages.

Lake et al., "Human-level concept learning through probabilistic program induction", Downloaded on Dec. 10, 2015, 8 pages, <http://www.sciencemag.org/>.

Mensink et al., "Distance-Based Image Classification: Generalizing to new classes at near-zero cost", IEEE Transactions on Pattern Analysis and Machine Intelligence, Institute of Electrical and Electronics Engineers, 2013, 35(11), pp. 2624-2637.

Pan et al., "A Survey on Transfer Learning", 1041-4347, © 2009 IEEE, 15 pages.

Salamon et al., "Deep Convolutional Neural Networks and Data Augmentation for Environmental Sound Classification", Nov. 28, 2016, arXiv:1608.04363v2 [cs.SD], 5 pages.

Sayers et al., "Probabilistic record linkage", Int. J. Epidemiol. Advance Access published Dec. 20, 2015, 11 pages, <https://doi.org/10.1093/ije/dyv322>.

Sung et al., "Learning to Compare: Relation Network for Few-Shot Learning", Mar. 27, 2018, arXiv:1711.06025v2 [cs.CV], 10 pages.

Tschandl et al., "Data Descriptor: The HAM10000 dataset, a large collection of multi-source dermatoscopic images of common pigmented skin lesions", Scientific Data, Published: Aug. 14, 2018, 9 pages.

Mnyals et al., "Matching Networks for One Shot Learning", 30th Conference on Neural Information Processing Systems (NIPS 2016), 9 pages.

Wang et al., "The Effectiveness of Data Augmentation in Image Classification using Deep Learning", Dec. 13, 2017, arXiv:1712.04621v1 [cs.CV], 8 pages.

Wong et al., "Understanding data augmentation for classification: when to warp?", Nov. 26, 2016, 6 pages, <http://arxiv.org/abs/1609.08764v2>.

Yu et al., "SeqGAN: Sequence Generative Adversarial Nets with Policy Gradient", Aug. 25, 2017, arXiv:1609.05473v6 [cs.LG], 11 pages.

* cited by examiner

Algorithm 1: Algorithm to obtain close cross-domain neighbours and extract aggregated linked information. © represents a concatenation operation.

Result: Cross-domain neighbours $C$, Aggregated neighbours data $A$, cross-domain linked data $U$
Initialisation: Dimension reduced $D_1$, $D_2$, labels $y_1$, $y^2$, Linkage matrix $D$, Number of close neighbours $Q$;

for each $S^1_i$ in $D_1$ do

$\quad I \leftarrow \mathrm{argmin}(d_{i1}, d_{i2}, \ldots \ldots, d_{iM})$;

$\quad I \leftarrow (I_j), \forall j, y^2_j = y^1_i$;

$\quad C^1_i \leftarrow \{S^2_{I(q)}\}_{q=1}^{Q}$;

$\quad A^1_i \leftarrow \dfrac{\Sigma(C^1_i)}{Q}$;

$\quad U^1_i = S^1_i \; © \; A^1_i$ end for each $S^2_j$ in $D_2$ do

$\quad I \leftarrow \mathrm{argmin}(d_{1j}, d_{2j}, \ldots \ldots, d_{Nj})$;

$\quad I \leftarrow (I_i), \forall i, y^1_i = y^2_j$;

$\quad C^2_j \leftarrow \{S^1_{I(q)}\}_{q=1}^{Q}$;

$\quad A^2_j \leftarrow \dfrac{\Sigma(C^2_j)}{Q}$;

$\quad U^2_j = S^2_j \; © \; A^2_j$ end

FIG. 6

VALIDATION: CROSS-DATASET LINKAGE
LINKAGE WITH DHS IMPROVES PMA PERFORMANCE – AUROC (%)

| | CLASSIFIER | DIMENSION REDUCTION | SEPARATED | LINKED | RANDOM |
|---|---|---|---|---|---|
| PMA ETH | LR | FEATURE IMPORTANCE | 50.03 | 55.31 | 51.39 |
| | RF | FEATURE IMPORTANCE | 46.93 | 61.18 | 48.80 |
| | RF | PRINCIPAL COMPONENT ANALYSIS | 47.00 | 63.49 | |
| | RF | AUTOENCODER | 47.78 | 85.04 | |

FIG. 7B

VALIDATION: CROSS-DATASET LINKAGE

LINKAGE WITH PMA IMPROVES DHS PERFORMANCE – AUROC (%)

| | CLASSIFIER | DIMENSION REDUCTION | SEPARATED | LINKED | RANDOM |
|---|---|---|---|---|---|
| DHS ETH | LR | FEATURE IMPORTANCE | 71.04 | 99.24 | 69.11 |
| | RF | FEATURE IMPORTANCE | 67.35 | 99.97 | 65.59 |
| | RF | PRINCIPAL COMPONENT ANALYSIS | 67.50 | 99.99 | |
| | RF | AUTOENCODER | 67.23 | 99.99 | |

FIG. 7C

VALIDATION: CROSS-COUNTRY, CROSS-DATASET LINKAGE

| | CLASSIFIER | DIMENSION REDUCTION | SEPARATED | ET | BF | GH | KE | NG |
|---|---|---|---|---|---|---|---|---|
| PMA ETH | LR | FEATURE IMPORTANCE | 50.03 | 55.31 | 58.06 | 55.42 | 51.98 | 51.90 |
| | RF | FEATURE IMPORTANCE | 46.93 | 61.18 | 62.19 | 59.67 | 55.78 | 58.31 |
| | RF | PRINCIPAL COMPONENT ANALYSIS | 47.00 | 63.49 | 64.86 | 74.12 | 56.25 | 68.89 |
| | RF | AUTOENCODER | 47.78 | 85.04 | 86.25 | 89.08 | 81.32 | 87.23 |

AUTOMATED DATA LINKAGES ACROSS DATASETS

BACKGROUND

The present invention relates generally to the field of data extraction technology, and more specifically data-driven insights for policy making.

Data extraction is a process that involves retrieval of data from various sources. Generally, data extraction is done with an effort to process the extracted data further, migrate the data to a data repository (such as a data warehouse or data lake) or to further analyze the extracted data. Data extraction is the act or process of retrieving data out of data sources for further data processing or data storage. The import into an intermediate extracting environment usually is followed by data transformation and possibly the addition of metadata prior to export to another stage of the data workflow. Data-driven data extraction is an approach that makes strategic decisions based on data analysis and interpretation.

Data collection is the process of gathering and measuring information on variables of interest, in an established systematic fashion that enables one to answer stated research questions, test hypotheses, and evaluate outcomes. Data collection is a component of research in all fields of studying including physical and social sciences, humanities, and business. The goal for all data collection is to capture quality evidence that allows analysis to lead to the formulation of convincing and credible answers to the questions that have been posed, and the emphasis on ensuring accurate and honest collection remains the same.

Data processing is the collection and manipulation of items of data to produce meaningful information. In this sense, it can be considered a subset of information processing, and the change of information in any manner detectable by an observer. Automatic data processing can refer to electronic data processing, and this uses relatively simple, repetitive activities to process large volumes of similar information.

SUMMARY

Embodiments of the present invention provide a computer system, a computer program product, and a method that comprises generating a baseline prediction for each database in a plurality of databases, wherein the generated baseline prediction includes datapoints for each performance feature of a respective database in the plurality of databases; generating a linkage matrix using a dimension reduction algorithm in an equal-dimensional feature space based on a measured difference between actual performance datapoints of each respective database and respective datapoints associated with generated baseline prediction for each database in the plurality of databases; linking one or more databases in the plurality of databases based on the measured difference within the generated linkage matrix reaching a predetermined threshold of measured performance; and generating a design using the linked databases for a computer system capable of being displayed through a user interface.

BRIEF DESCRIPTION OF THE DRAWINGS

FIG. 6 is an illustration of an algorithm used to select cross-domain neighbors, in accordance with at least one embodiment of the present invention;

FIG. 7A-E are a collection of examples of output of a cross-dataset linkage, in accordance with at least one embodiment of the present invention.

DETAILED DESCRIPTION

Embodiments of the present invention recognize the need for an improvement to current data collection technologies that aim to exploit two or more disjoint studies or modalities, that do not have over-lapping features, by linking these modalities at data-level to improve performance on each modality and achieve cross-modality explainability. Embodiments of the present invention provides systems, methods, and computer program products for an improvement to existing cross-modality linkage. Currently, data is the most valuable asset to possess in the growing trend of extracting data-driven insights for policy making and process automation. Thus, significant resources are allocated for collecting such data, especially in low constrained settings. Aggregate use of data obtained from multiple special and temporal instances help to encode better generalizability during a cross-modality analysis. Current cross-modality linkages focus on computer vision, or image modality, meta-data dependent on a dataset, and one directional transfer of data. Moreover, the existing data linkage techniques are motivated in line with entity reconciliation that requires common attributes across the datasets or modalities. Some of the techniques generally used include data augmentation, synthetic data generation, transfer learning, which encompasses domain adaptation, multi-task learning, and few show learning, record linkage, and entity reconciliation services. Embodiments of the present invention provide an improvement to current cross-dataset utilization services by linking datasets that are disjointed without common attributes across them; and the program does this by projecting these datasets into an equal-dimensional feature space, which also acts as a dimension reduction, and compute a linkage matrix that contains the distance metrics among samples across different datasets, which allows for the cross-modality analysis to occur in the absence of common features. Embodiments of the present invention retrieves input from at least one database, generates a prediction as a model for each database, which would be used as a baseline to compare the performance achieved subsequent to the cross-dataset linkage, then data-level linkage of these databases is obtained by projecting the databases in equal-dimensional feature space on which the linkage matrix is computed to obtain neighbor samples across the databases. The model is performed on the linked database and prediction performance would be compared to the baseline.

Figure 1:
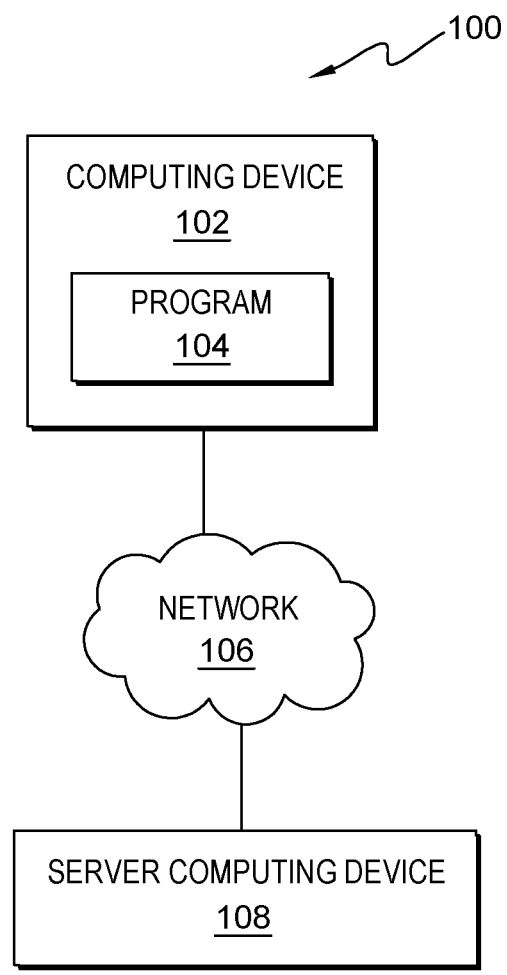
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 8.

The computing device 102 may include a program 104. The program 104 may be a stand-alone program on the computing device 102. In another embodiment, the program 104 may be stored on a server computing device 108. In this embodiment, the program 104 retrieves input from at least one database, generates a prediction as a model for each database, links the model predictions to generate a baseline, compares the model predictions in a equal-dimensional feature space using a dimension reduction algorithm, computes a linkage matrix based on distance between the database samples in the reduced feature space, and measuring performance improvement and impact analysis by performing a cross-database modelling on the linked databases. For example, the program 104 receives input data from multiple modalities that each encompass a specific characteristic such as nutrition, transportation, and healthcare; generates a performance prediction based on the received input for each modality; projects the modalities into equal-dimensional feature space using a dimension reduction technique; evaluates distance metric for each pair of samples extracted from different datasets or modalities; identifies close neighbors for samples across modalities using the distance metric; aggregate extracted data from the close neighbors and link to an original feature space; generate output modelling and prediction based on linked datasets; and measures performance improvement and cross-modality impact analysis of common features.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106.

Figure 2:
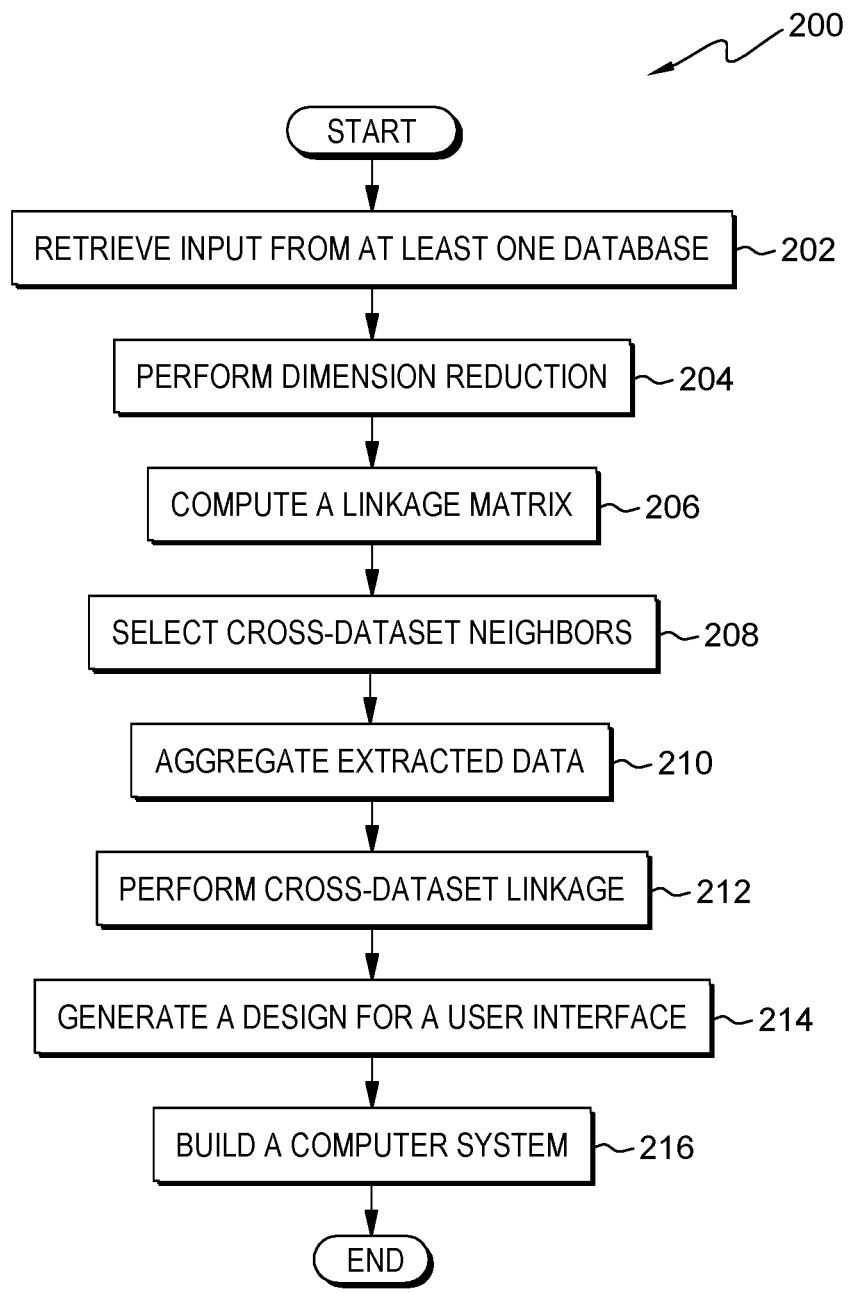
FIG. 2 is a flowchart illustrating operational steps for generating an over-lapping data-linkage dataset explanation, in accordance with at least one embodiment of the present invention.

FIG. 2 is a flowchart illustrating operational steps for measuring performances predictions using a dimension reduction algorithm, in accordance with at least one embodiment of the present invention.

In step 202, the program 104 retrieves input from at least one database. In this embodiment, the program 104 receives opt-in/opt-out permission from a user to gain access to a specific modality, which allows the program 104 to receive input from that modality. For example, the program 104 receives user transformation data from the transformation modality or transformation database.

In step 204, the program 104 performs dimension reduction. In this embodiment, the program 104 preforms dimension reduction on retrieved input by projecting two datasets to equal-dimensional spaces that enables head-to-head comparison of samples in different datasets, potentially, with different types and number of features. Equidimensional is applied to objected that have nearly the same size or spread in multiple directions and across any number of dimensions. In this embodiment, the program 104 performs dimension reduction by utilizing the following as a function:

$$D_1 \in \mathbb{R}^K \to \hat{D}_1 \in \mathbb{R}^R \quad (1)$$

$$D_2 \in \mathbb{R}^L \to \hat{D}_2 \in \mathbb{R}^R \quad (2)$$

With respect to equations (1) and (2), $D_1$ and $D_2$ represent disjointed databases and $D_{12}$ and $D_{21}$ represent the linked databases. $\mathbb{R}$ represents the dimension of the feature space: K, L and R represent the dimension of the feature space of, respectively, $D_1$, $D_2$ and $D_{12}$ or $D_{21}$, and R is equal to or less than K or L due to the feature dimension. In this embodiment, $D_{12}$ and $D_{21}$ are both linked datasets but differ on the application of linkage; in $D_{12}$—the baseline dataset is $D_1$ and more data is extracted from $D_2$ and linked to the baseline $D_1$; in $D_{21}$—the baseline dataset is $D_2$ and more information is extracted from $D_1$ and linked to the baseline $D_2$. In this embodiment, the program 104 utilizes equation (1) and (2) to perform dimension reduction, which projects at least two datasets into equal-dimensional feature spaces that allows for a head-to-head comparison of samples across datasets. For example, the program 104 preforms dimension reduction based on principal components analysis, using top R Eigenvectors; feature importance score, using top positive and negative directed R features; and dense autoencoder, using R-dimensional encoder output.

In step 206, the program 104 computes a linkage matrix. In this embodiment, the program 104 computes a linkage matrix for close neighbors based on the performed dimension reduction. In this embodiment, the program 104 computes the linkage matrix to link samples across the two domains, and this matrix contains the distance between every pair of samples. In this embodiment, the program 104 computes the linkage matrix by utilizing the following as a function:

$$\hat{s}_i^1 \in D_1, \hat{s}_j^2 \in D_2 \quad (3)$$

$$d_{ij} = \sqrt{\Sigma_R (\hat{s}_i^1 - \hat{s}_j^2)^2} \quad (4)$$

With respect to equations (3) and (4), $$D = \begin{bmatrix} d_{11} & d_{12} & \cdots & d_{1M} \\ d_{21} & d_{21} & \cdots & d_{2M} \\ & & \ddots & \\ d_{N1} & d_{N2} & \cdots & d_{NM} \end{bmatrix},$$

i is a variable that represent a range from 1 to N (the indices of samples in $D_1$); j is a variable that represents a range from 1 to M (the indices of samples in $D_2$); and $d_{ij}$ represents the Euclidean distance between $\hat{s}_i^1$ in $D_1$ and $\hat{s}_j^2$ in $D_2$. In this embodiment, the domain is defined as a specific cluster of information with peculiar characteristics. For example, the program 104 computes a linkage matrix that details the distance between a transportation domain and a nutrition domain. In another embodiment, the program 104 may use the computed linkage matrix to identify close neighbors of samples across datasets and link the information between these close neighbors. In another embodiment, the program 104 integrates domain expert knowledge within the linkage matrix computation.

In step 208, the program 104 selects cross-dataset neighbors. In this embodiment, the program 104 selects close neighbors for each sample by soft-matching cross-dataset based on the computation of the linkage matrix for the nearest cross-domain neighbors. In this embodiment, the program 104 defines dataset and domain as interchangeable. In this embodiment, the program 104 selects cross-domain neighbors by utilizing the following as a function:

$$C_i^1 \leftarrow \{S_{I(q)_{q=1}} \varrho^2\} \quad (5)$$

$$C_j^2 \leftarrow \{S_{I(q)_{q=1}} \varrho^1\} \quad (6)$$

With respect to equations (5) and (6), Q represents a number of close neighbors and $C_i^1$ and $C_j^2$ represent the selected cross-domain neighbors. The neighbors in $C_i^1$ contains samples from $D_2$ and similarly the neighbors in $C_j^2$ contain samples from $D_1$. In this embodiment, the program 104 utilizes equations (5) and (6) by soft-matching cross-domain neighbors, which is specific to each sample and each cross-domain neighbor. For example, the program 104 selects domain neighbors based on common features, a weighted feature based on a t-score, and mean features from cross-domains. In another embodiment, the program 104 uses the selection method to select a cross-domain neighbor that does not have a common data point nor feature. In another embodiment, the program 104 selects cross-domain neighbors based on a feature scaling of a variable's standard deviation of the importance score, which has an effect on a datasets distance to another dataset.

In step 210, the program 104 aggregates extracted data. In this embodiment, the program 104 extracts data from the selected cross-domain neighbor, averages the extracted data based on features, and aggregates the averages to generate an aggregated data extraction. In this embodiment, the program 104 aggregates extracted data by utilizing the following formula:

$$A_i^1 \leftarrow \frac{\sum (C_i^1)}{Q} \quad (7)$$

$$A_j^2 \leftarrow \frac{\sum (C_j^2)}{Q}. \quad (8)$$

With respect to equations (7) and (8), $A_i^1$ and $A_j^2$ represents the aggregated data extraction, and the other variables represented in previous equations. For example, the program 104 extracts data from multiple transportation domains, averages the data based on distance, and aggregates the averages of distance to generate an aggregated distance for the selected cross-domains. In another embodiment, the program 104 aggregates extracted data even when there are no data points or features that are in common.

In step 212, the program 104 performs cross-dataset linkage. In this embodiment, the program 104 preforms cross-domain linkage by concatenating original data and aggregate extracted data. In this embodiment, the program 104 preforms the cross-domain linkage to measure performance improvement and cross-domain impact analysis of features across domains or datasets. In this embodiment, the program 104 performs cross-domain linkage to achieve performance improvement in each domain by utilizing linked information from selected cross-domain neighbors. In this embodiment, the program 104 provides a cross-domain explainability, which enables the analysis of the impact of a feature in one domain on the outcome of a different domain. In this embodiment, the program 104 utilizes large, unlabeled domains by performing cross-domain linkage. For example, the program 104 performs a cross-domain linkage on transportation domains, measures the transportation output of the linked cross-domains, and analyzes the impact of user intervention to the measured output based on the computation of the linkage matrix. In another embodiment, the program 104 applies the cross-domain linkage in data-driven approaches in low or limited resource settings (e.g., less precise acquisition devices, unsatisfactory domain experts, limited data availability, and computational resources). In another embodiment, the program 104 measures performance improvement of the one or more linked databases and measures effects of remaining features not previously measured based on the performance improvement of measured features within the one or more linked databases.

In step 214, the program 104 generates a design for a user interface. In this embodiment, the program 104 generates a design for a user interface based on the measured performance improvement compared to the baseline. In this embodiment, the program 104 generates a design for a user interface that allows a user to identify improvement scores for specific features of the computing device 102 based on the cross-dataset linkage. In this embodiment, the program 104 generates a design for a user interface comprised with haptic sensors that receive input from a user. In this embodiment, the program 104 receives input via haptic sensors and optimizes the generated design for the user interface. In this embodiment, the program 104 optimizes the generated design for the user interface by ranking aggregated extracted data by at least one category, where a category may be sample number, identified location, dataset, size, etc. For example, the program 104 generates a smart car user interface that displays the measured performance of features of the smart car based on the cross-domain linkage of the transportation dataset and the nutrition dataset. In another embodiment, the program 104 receives input from haptic sensors of a computing device for a linked database in the plurality of databases; generates a design for a first computer system based on received input from haptic sensors of a computing device; modifies the generated design for the first computer system based on received input from haptic sensors of the computing device; optimizing the generated design for the first computer system based on the modified, generated design for the first computer system; displaying the optimized, generated design for the first computer system based on a combination of the modified design, received input from haptic sensors of the computing device, and the linked database; and building a second computing system based on an optimized design of the computer system capable of being displayed through the user interface.

In step 216, the program 104 builds a computer system. In this embodiment, the program 104 builds a computer system based of the cross-domain linkage and generated design of the user interface. In this embodiment, the program 104 builds the computer system to improve the performance of the features of the computing device 102. In another embodiment, the program 104 builds a computer system based on the received input from the haptic sensors of the generated design of the user interface. In another embodiment, the program 104 builds a computer system based on the optimized cross-domain linkage in combination with the received input from the haptic sensors of the generated design of the user interface, and the built computer system improves the performance of the features of the computing device 102.

Figure 3:
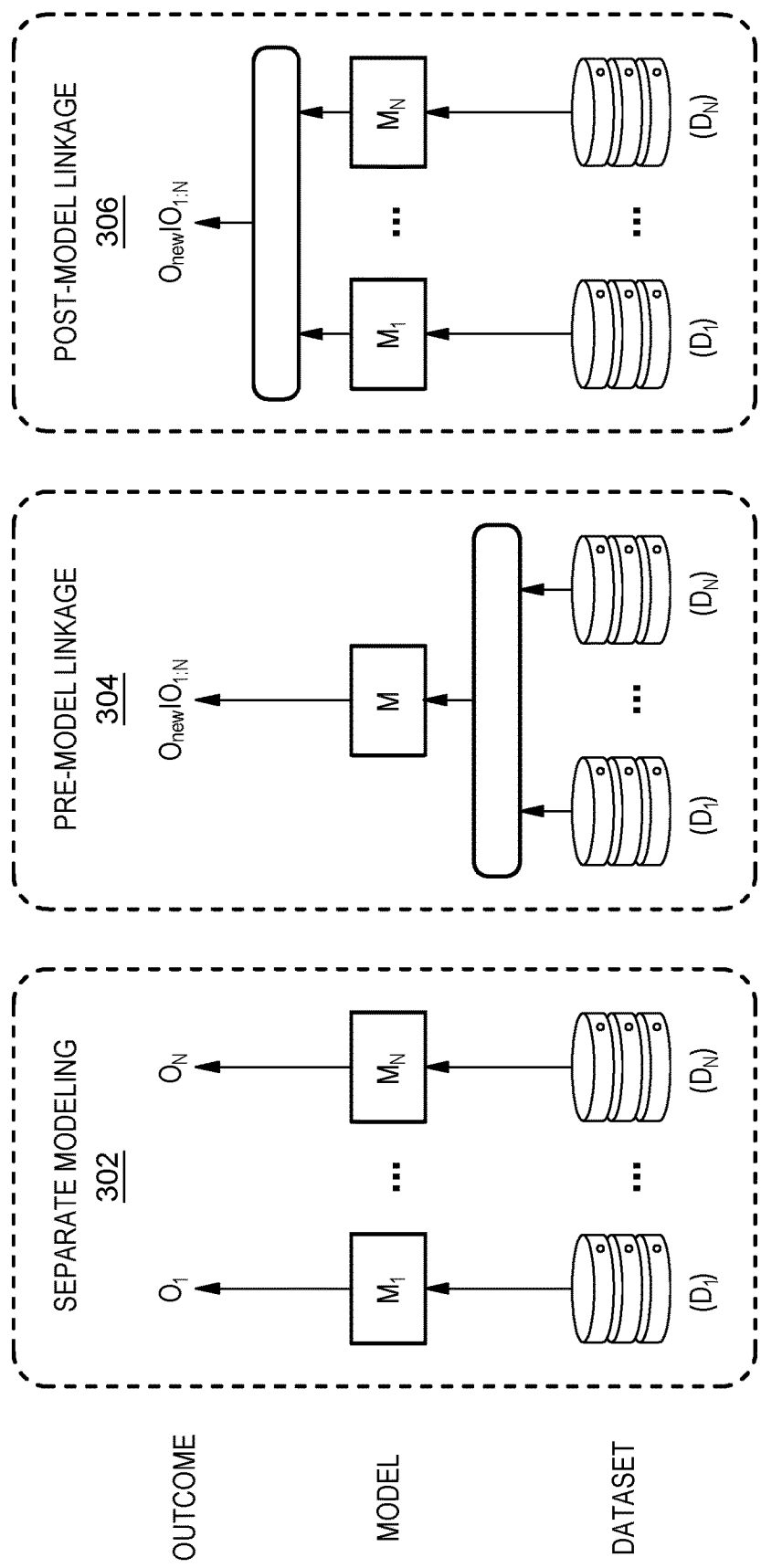
FIG. 3 is a collection of examples that illustrate a cross-domain linkage, in accordance with at least one embodiment of the present invention.

FIG. 3 illustrates multiple examples of a cross-domain linkage, in accordance with at least one embodiment of the present invention.

Example 302 depicts an example of separate modelling without the use of the cross-domain linkage. In example 302, the program 104 analyzes at least one dataset, which are represented by $D_1$ and $D_N$. In example 302, the program 104 generates at least one model, which are represented by $M_1$ and $M_N$. In example 302, the program 104 predicts outcomes, which are represented by $O_1$ and $O_N$, based on a model that correlates with the outcome.

Example 304 depicts an example of a pre-model cross-domain linkage. In example 304, the program 104 analyzes at least two databases, which are represented by $D_1$ and $D_N$. In example 304, the program 104 performs a cross-domain linkage based on the analysis of the databases. In example 304, the program 104 generates a model, which is represented by M, based on the cross-domain linkage. In example 304, the program 104 predicts an outcome, which is represented by $O_{new}$ (if the linked has single outcome) or $O_{1:N}$ (if each dataset has different outcome) based on the generated model.

Example 306 depicts an example of a post-model cross-domain linkage. In example, 306, the program 104 analyzes at least two databases, which are represented by $D_1$ and $D_N$. In example 306, the program 104 generates at least two models, which are represented by $M_1$ and $M_N$, based on the analysis at least two datasets. The outputs of these models are used as a baseline to compare the measured performance improvement achieved using the cross-domain linkage. In example 306, the program 104 performs a cross-domain linkage based on the generated models. In example 306, the program 104 predicts an outcome based on the cross-domain linkage.

Figure 4:
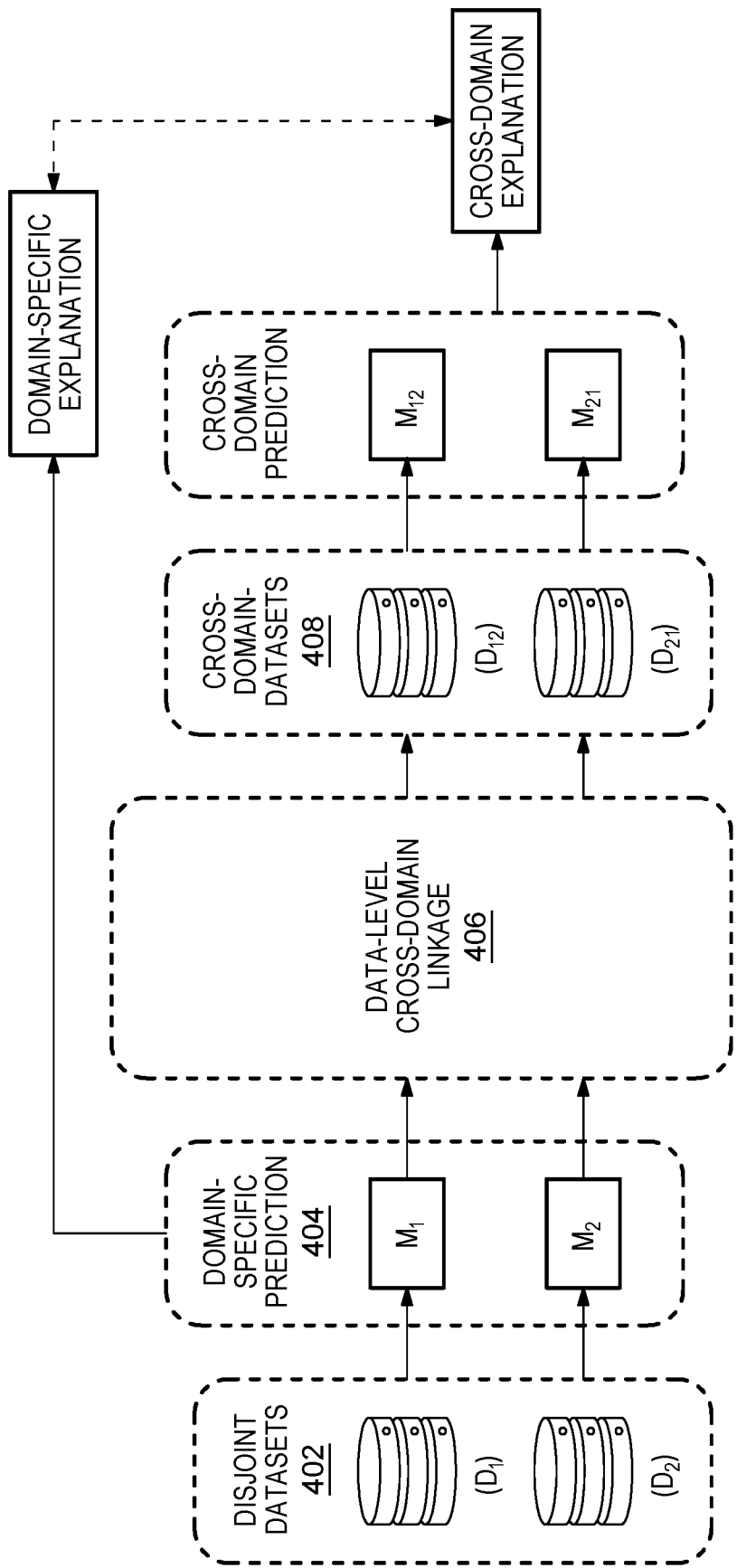
FIG. 4 is a sample diagram illustrating operational steps for generating a cross-domain explanation, in accordance with at least one embodiment of the present invention.

FIG. 4 is a sample diagram 400 illustrating operational steps for generating a cross-domain explanation, in accordance with at least one embodiment of the present invention.

In step 402, the program 104 analyzes at least two datasets. In this embodiment, the program 104 analyzes at least two datasets, which are represented by $D_1$ and $D_2$. In this embodiment, the program 104 analyzes at least two disjointed datasets by tracking a set of elements partitioned into a number of disjoint subsets and providing near-constant time operations to add new sets, merge existing sets, and determine whether elements are in the same set.

In step 404, the program 104 generates at least two predictions. In this embodiment, the program 104 generates at least two domain specific predictions, and these predictions may be generated models based on the analysis of the disjointed datasets.

In step 406, the program performs data-level cross-domain linkage. In this embodiment, the program 104 performs data-level cross-domain linkage, which is disclosed in a previous figure. In this embodiment the program 104 performs data-level cross-domain linkage by retrieving data from at least two disjointed datasets; performing dimension reduction; computing a linkage matrix; selecting cross-domain neighbors; and aggregating extracted data.

In step 408, the program 104 generates at least two cross-domain datasets. In this embodiment, the program 104 generates at least two cross-domain datasets, which are represented by $D_{12}$ and $D_{21}$, based on the data-level cross-domain linkage. In this embodiment, the cross-domain datasets are generated from linked disjointed datasets.

In step 410, the program 104 generates at least two cross-domain datasets and predictions. In this embodiment, the program 104 generates at least two cross-domain datasets and their associated prediction models, which are represented by $M_{12}$ and $M_{21}$, based on an analysis of the generated cross-domain datasets. In this embodiment, the program 104 generates at least two-domain predictions using $D_{12}$ and $D_{21}$ as data, and their models $M_{12}$ and $M_{21}$. The prediction performance is compared with the baseline outputs.

In step 412, the program generates a cross-domain explanation. In this embodiment, the program 104 generates a cross-domain explanation based on the generated cross domain predictions. In this embodiment, the program 104 generates a cross-domain explanation, and the explanation is output based on the analysis of the disjointed datasets and the analysis of the generated cross-domain predictions. For example, the program 104 generates a cross-domain explanation that details the transportation data of linked transportation datasets. In another embodiment, the program 104 generates a domain specific explanation based on the generated domain-specific prediction.

Figure 5:
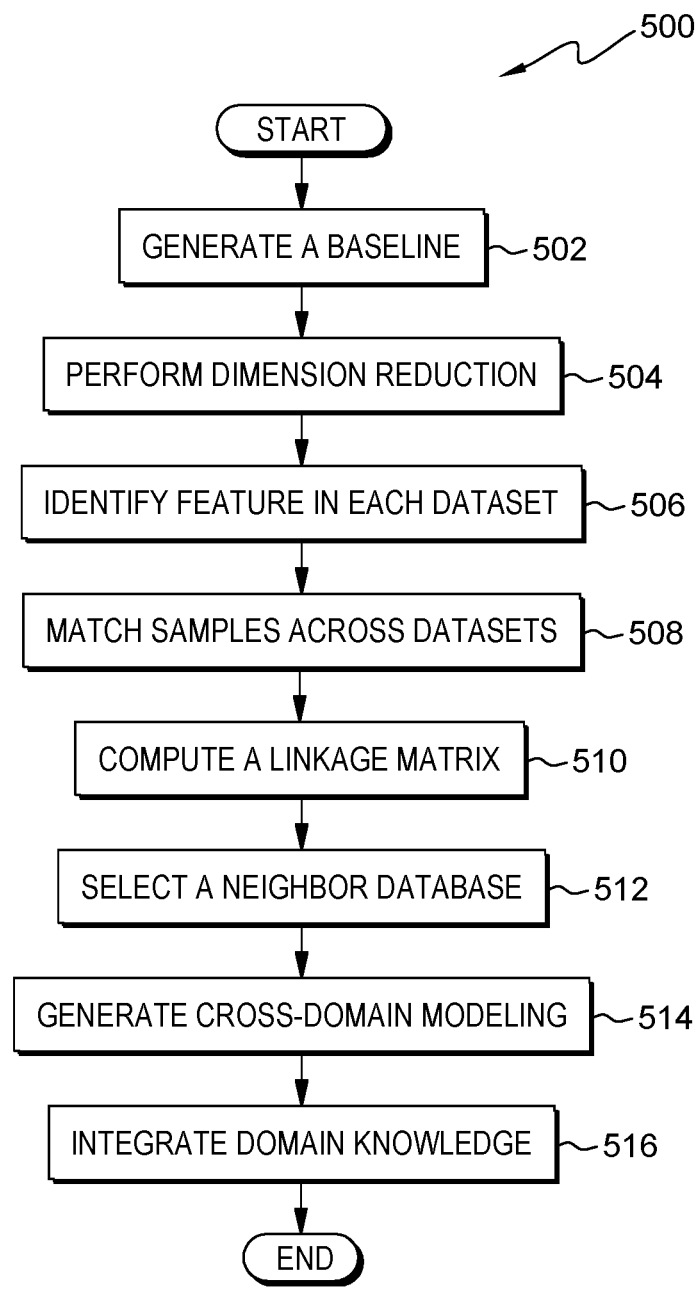
FIG. 5 is a flowchart 500 illustrating operational steps to perform a cross-domain modelling on linked datasets, in accordance with at least one embodiment of the present invention.

FIG. 5 is a flowchart 500 illustrating operational steps to perform a cross-domain modelling on linked datasets, in accordance with at least one embodiment of the present invention.

In step 502, the program 104 generates a baseline. In this embodiment, the program 104 generates a baseline based on domain-specific predictions. In this embodiment, the domain-specific predictions correspond with each dataset, which make the predictions specific to the dataset. For example, the program 104 generates a driving speed baseline based on transportation dataset predictions.

In step 504, the program 104 performs dimension reduction. In this embodiment, the program 104 projects these datasets into an equal-dimensional feature space and achieves a dimension reduction. In this embodiment, the program 104 projects these datasets into equal-dimensional feature space to compare the distance between samples in different datasets, which were originally represented by different type and dimension of feature spaces.

In step 506, the program 104 identifies important features in each dataset. In this embodiment, the program 104 identifies important features to utilize positive and negative features based on a computed t-score for each dataset after modelling. In this embodiment, the program 104 computes the t-score for each dataset by evaluating the significance or importance score of each feature in the outcome prediction.

In step 508, the program 104 matches samples across datasets. In this embodiment, the program 104 matches samples across datasets by using at least one machine learning techniques to provide unsupervised dimension reduction. In this embodiment, the program 104 matches samples across datasets by using a principal component analysis and autoencoders, which provide unsupervised dimension reduction that enables compute the linkage matrix using distance metric.

In step 510, the program 104 computes a linkage matrix. In this embodiment, the program 104 computes a linkage matrix as discussed in a previous figure. In this embodiment, the program 104 computes a linkage matrix by computing pair-wise distance between samples. In this embodiment, the program 104 computes the linkage matrix in response to performing the dimension reduction.

In step 512, the program 104 selects close neighbors across databases. In this embodiment, the program 104 selects samples in the other database that are close neighbor for a baseline database using the distance metric in the linkage matrix, i.e., samples with the lower distance metrics are assumed to be close neighbors. In this embodiment, the program 104 applies a soft-neighbor database selection method. In this embodiment, the program 104 uses the computed linkage matrix and data identified in the neighbor database to aggregate and concatenate each sample to select neighbor databases.

In step 514, the program 104 generates cross-domain modelling. In this embodiment, the program 104 generates cross-domain modelling based on the linked datasets. In this embodiment, the program 104 generates cross-domain modelling and provide the outcome prediction is measured for comparison with the baseline performance without linkage. In this embodiment, the program 104 generates cross-domain modelling to analyze cross-dataset impact of features.

In step 516, the program 104 integrates domain knowledge. In this embodiment, the program 104 integrates domain knowledge within the generated cross-domain models based on expert knowledge. In this embodiment, the program 104 integrates domain knowledge within the generated cross-domain models based on the expert knowledge, and the expert knowledge is integrated in the linkage matrix computation and select close neighbors.

FIG. 6 is an illustration of an algorithm 600 used to select cross-domain neighbors, in accordance with at least one embodiment of the present invention.

In this embodiment, the program 104 uses the algorithm 600 to select cross-domain neighbors and extract aggregated linked information. In this embodiment, the algorithm 600 is depicted by the following equation:

$$I^- \leftarrow \operatorname{argmin}(d_{i1}, d_{i2}, \ldots, d_{iM}); \quad (9)$$

$$I \leftarrow (I_j^-), A_j, y_j^2 = y_i^1;$$

(5)

(7)

$$U_i^1 = S_i^1 \copyright A_i^1$$

$$I^- \leftarrow \operatorname{argmin}(d_{1j}, d_{2j}, \ldots, d_{Nj}); \quad (10)$$

$$I \leftarrow (I_i^-), A_i, y_i^1 = y_j^2;$$

(6)

(8)

$$U_j^2 = S_j^2 \copyright A_j^2$$

With respect to equations (9) and (10), C represents cross-domain neighbors, A represents aggregated neighbor data, U represent cross-domain linkage, S represents dimension reduction, Q represents the number of close neighbors, and © represents a concatenation operation. In this embodiment, the algorithm 600 uses equation (5) and equation (7) to reach the output for the cross-domain linkage for a specific cross-dataset. In this embodiment, the algorithm uses equation (6) and equation (8) to reach the output for the cross-domain linkage for a different specific cross-dataset. In response to reaching the output for the cross-domain linkage and in this embodiment, the algorithm 600 calculates the measured performance improvement for the generated cross-domain linked datasets. In this embodiment, the algorithm 600 computes the linked datasets $D_{12}$ and $D_{21}$ as follows:

$$D_{12} = (U_i^1)_{i=1}^N \quad (11)$$

$$D_{21} = (U_j^2)_{j=1}^M \quad (12)$$

With respect to equations (11) and (12), $D_{12}$ and $D_{21}$ represent the cross-domain linked datasets. In this embodiment, the algorithm 600 uses the equations (11) and (12) to select the cross-domain linked datasets. In this embodiment, the algorithm 600 selects the cross-domain linked datasets and the dimension of the feature space in the linked datasets becomes the some of the individual dimensions of the disjointed datasets K and L as:

$$D_{12}, D_{21} \in \mathfrak{R}^{K+L} \quad (13)$$

With respect to equation (13), $\mathfrak{R}^{K+L}$ represents the feature spaces in the linked datasets are the union of the feature spaces from the disjoint datasets, i.e., $D_1$ has original K dimensions and $D_2$ has L-dimensional feature spaces, respectively. Thus, the linked datasets, $D_{12}$ and $D_{21}$ will have the sum of these feature dimensions.

FIG. 7 is a collection of examples of output of a cross-dataset linkage, in accordance with at least one embodiment of the present invention.

Figure 7A:
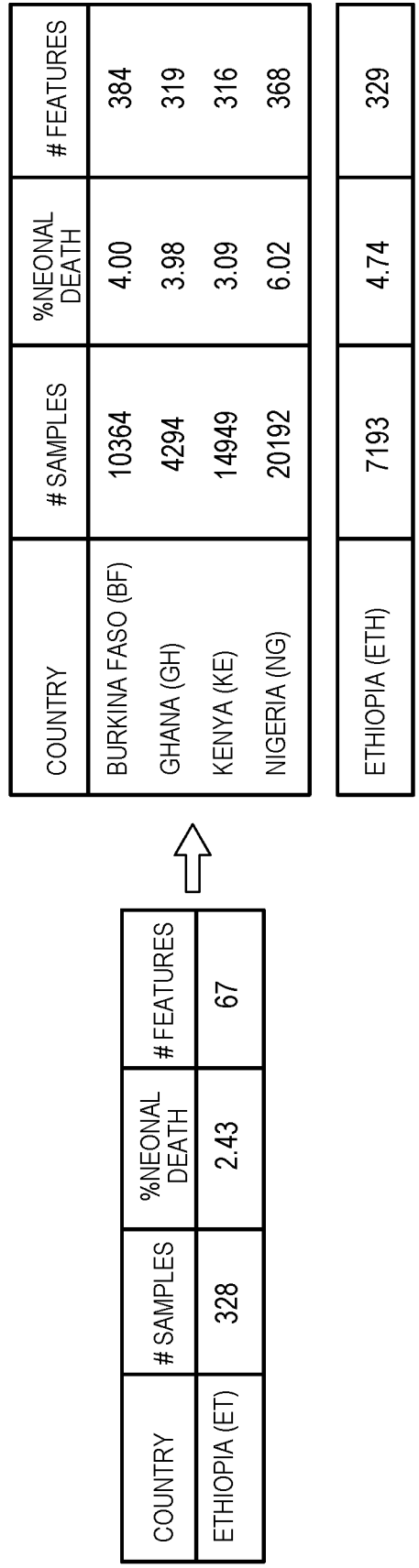

FIG. 7A is an example 700 of implementation of a cross-dataset linkage. In this embodiment, the example 700 identifies a country, determines a number of samples associated with the identified country, extracts a percentage of data from the determined number of samples, and displays a number of features. In this embodiment, the example 700 displays the similar information from cross-domain linked dataset to validate the cross-dataset linkage. In this embodiment, the example 700 displays data from on dataset that identifies the country as Ethiopia, determines that there are 328 samples associated with Ethiopia, extracts a 2.43% of death from the 328 samples, and displays 67 features. In this embodiment, the example 700 displays data from a disjointed dataset that identifies countries such as Burkina Faso, Ghana, Kenya, Nigeria, and Ethiopia; determines that there are 10,364 samples associated with Burkina Faso, 4,294 samples associated with Ghana, 14,949 samples associated with Kenya, 20,192 samples associated with Nigeria, and 7,193 samples associated with Ethiopia; extracts a 4.00% of death from 10,364 samples, extracts a 3.98% of death from 4,294 samples, extracts a 3.09% of death from 14,949 samples, extracts a 6.02% of death from 20,192 samples, and extracts 4.74% of death from 7,193 samples; and displays 384 features for Burkina Faso, displays 319 features for Ghana, displays 316 features for Kenya, displays 368 features for Nigeria, and displays 329 features for Ethiopia. In this embodiment, the example 700 For example, this example 700 displays a performance monitoring and accountability dataset cross-domain linked with a demographic and health survey dataset, which are collected to understand maternal and child health.

FIG. 7B is an example 702 of a measurement of performance improvement of a cross-dataset linkage before the linkage. In this embodiment, the example 702 identifies a classifier, determines the type of dimension reduction, and calculates the performance improvement percentage for separated domain datasets, cross-domain linked datasets, and random datasets. In this embodiment, the example 702 identifies a logistic regression classifier; determines a feature importance type of dimension reduction was performed; and calculates a 50.03% improvement percentage for a separated dataset, a 55.31% improvement percentage for a linked dataset, and a 51.39% improvement percentage for a random dataset. In this embodiment, the example 702 displays three types of dimension reduction, feature importance, principal component analysis, and autoencoder.

FIG. 7C is an example 704 of a measurement of performance improvement of a cross-dataset linkage after the linkage. In this embodiment, the example 704 identifies a classifier, determines the type of dimension reduction, and calculates the performance improvement percentage for separated domain datasets, cross-domain linked datasets, and random datasets. In this embodiment, the example 704 identifies a random field classifier; determines an autoencoder type dimension reduction was preformed; and calculates a 67.23% improvement percentage for a separate dataset and a 99.99% improvement percentage for a linked dataset. In this embodiment, the example 704 displays three types of dimension reduction, feature importance, principal component analysis, and autoencoder.

FIG. 7D is an example 706 of a validation of the cross-domain linkage. In this embodiment, the example 706 validates the improvement percentage of cross-domain linked datasets across multiple countries. In this embodiment, the example 706 identifies a random field classifier; determines a principal component analysis type of dimension reduction was performed; and calculates a 47.00% improvement percentage for separated datasets, a 63.49% improvement percentage for Ethiopia, a 64.86% improvement percentage for Burkina Faso, a 74.12 improvement percentage for Ghana, a 56.25% improvement percentage for Kenya, and a 68.89% improvement percentage for Nigeria. In this embodiment, the example 706 displays the numerical differences for the performance improvement for separated datasets as compared to the performance improvement for cross-domain linked datasets.

Figure 7E:
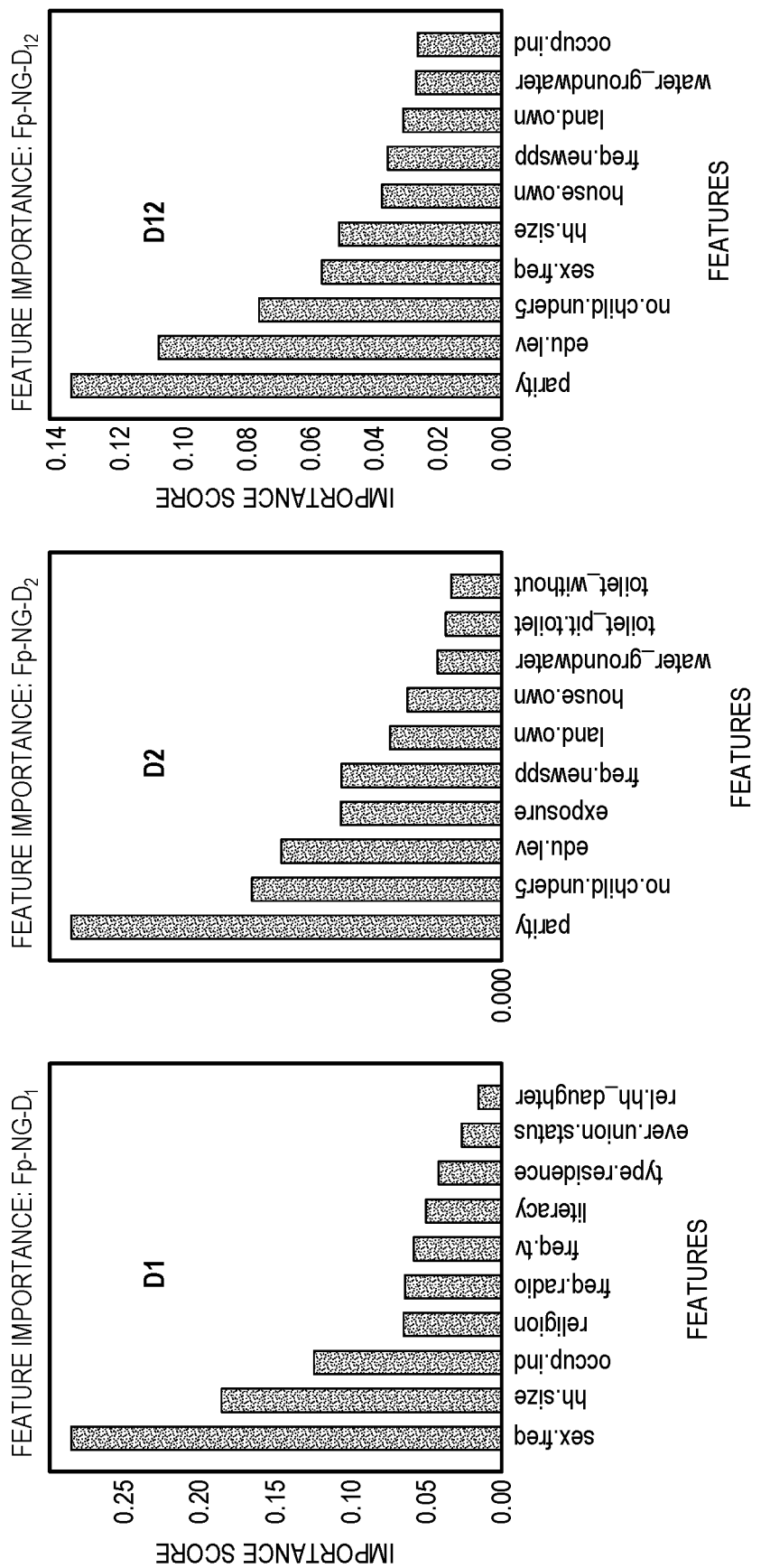

FIG. 7E is an example 708 of a bar graph validation of the cross-domain linkage. In this embodiment, the example 708 depicts the validation in a series of bar graphs. In this embodiment, the example 708 provides the measured performance improvement in relation to the features of each separate domain. In this embodiment, the example 708 maintains a x-axis for features and a y-axis for importance score; for dataset 1, the parity is not a feature that is analyzed, but the size feature is measured at an improvement score of 0.19; for dataset 2, the parity feature is measured at an improvement score of 0.13, but the size is not a feature that is analyzed; and for the linked dataset 12, the parity feature is measured at an improvement score of 0.13, and the size feature is measured at an improvement score of 0.06. In this embodiment, the example 708 also provides the measured performance improvement in relation to the features for the cross-domain linked dataset. In this embodiment, the example 708 validates the improvement percentage and depicts the validation via bar graphs. In this embodiment, the example 708 illustrates a bar graph that shows the top ten important features for the correct outcome prediction in $D_1$, $D_2$ and $D_{12}$ and their improvement score that is a relative weight a particular feature carries to determine the outcome.

Figure 8:
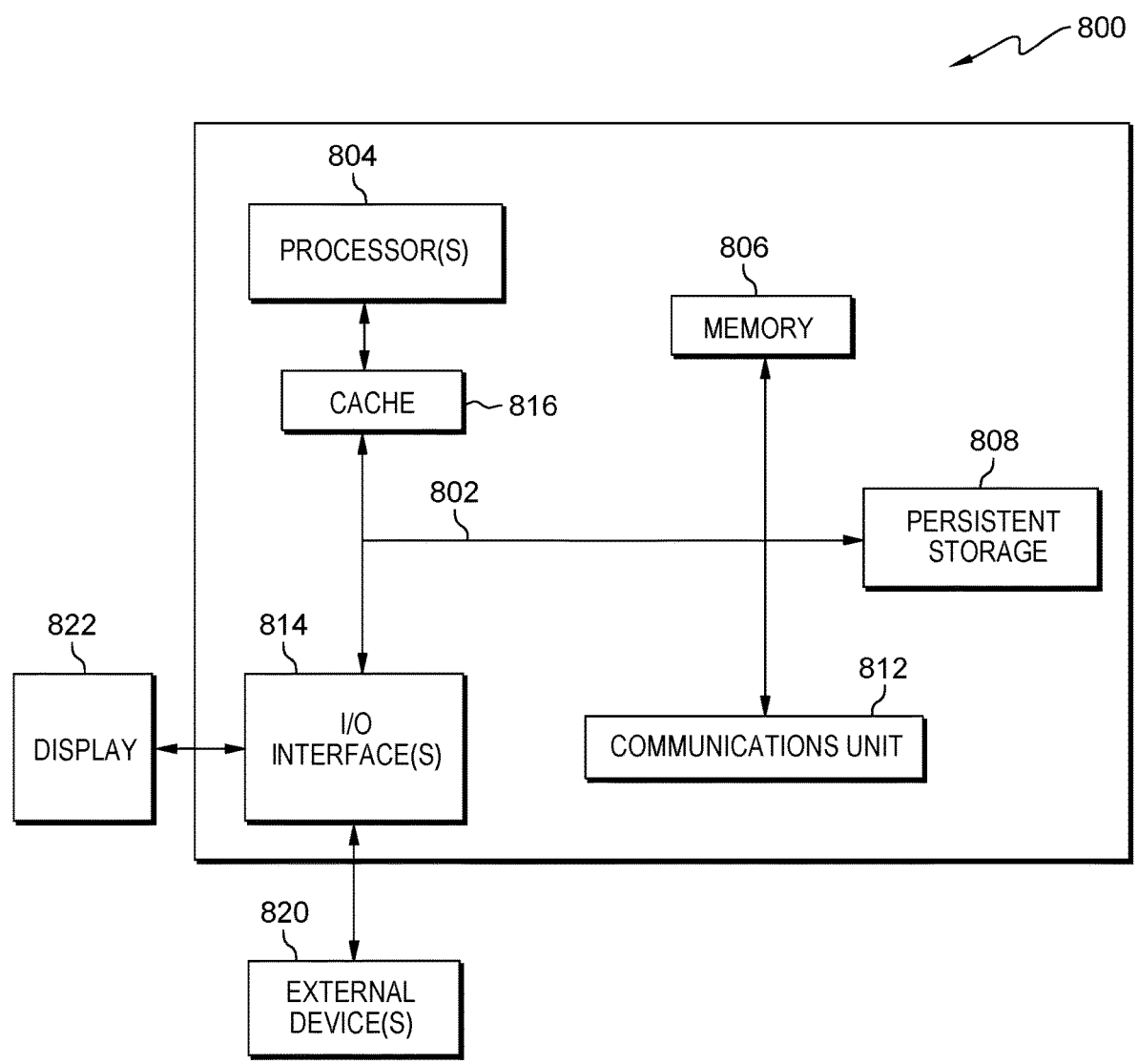
FIG. 8 depicts a block diagram of components of computing systems within a computing display environment of FIG. 1, in accordance with an embodiment of the present invention.

FIG. 8 depicts a block diagram of components of computing systems within a computing system 800 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computing system 800 includes a communications fabric 802, which provides communications between a cache 816, a memory 806, a persistent storage 808, a communications unit 810, and an input/output (I/O) interface(s) 812. The communications fabric 802 can be implemented with any architecture designed for passing data and/or control information between processors (such as microprocessors, communications and network processors, etc.), system memory, peripheral devices, and any other hardware components within a system. For example, the communications fabric 802 can be implemented with one or more buses or a crossbar switch.

The memory 806 and the persistent storage 808 are computer readable storage media. In this embodiment, the memory 806 includes random access memory (RAM). In general, the memory 806 can include any suitable volatile or non-volatile computer readable storage media. The cache 816 is a fast memory that enhances the performance of the computer processor(s) 804 by holding recently accessed data, and data near accessed data, from the memory 806.

The program 104 may be stored in the persistent storage 808 and in the memory 806 for execution by one or more of the respective computer processors 804 via the cache 816. In an embodiment, the persistent storage 808 includes a magnetic hard disk drive. Alternatively, or in addition to a magnetic hard disk drive, the persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 808 may also be removable. For example, a removable hard drive may be used for the persistent storage 808. Other examples include optical and magnetic disks, thumb drives, and smart cards that are inserted into a drive for transfer onto another computer readable storage medium that is also part of the persistent storage 808.

The communications unit 810, in these examples, provides for communications with other data processing systems or devices. In these examples, the communications unit 810 includes one or more network interface cards. The communications unit 810 may provide communications through the use of either or both physical and wireless communications links. The program 104 may be downloaded to the persistent storage 808 through the communications unit 810.

The I/O interface(s) 812 allows for input and output of data with other devices that may be connected to a mobile device, an approval device, and/or the server computing device 108. For example, the I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 808 via the I/O interface(s) 812. The I/O interface(s) 812 also connect to a display 820.

The display 820 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
generating a baseline prediction for each database in a plurality of databases, wherein the generated baseline prediction includes datapoints for each performance feature of a respective database in the plurality of databases;
generating a linkage matrix using a dimension reduction algorithm in an equal-dimensional feature space based on a measured difference between actual performance datapoints of each respective database and respective datapoints associated with the generated baseline prediction for each database in the plurality of databases;
linking one or more databases in the plurality of databases based on the measured difference within the generated linkage matrix reaching a predetermined threshold of measured performance; and
generating a design using the linked databases for a computer system capable of being displayed through a user interface.

2. The computer-implemented method of claim 1, wherein generating the linkage matrix using the dimension reduction algorithm in the equal-dimensional feature space based on a measured difference in actual performance datapoints to datapoints of the generated baseline prediction for each database in the plurality of databases comprises:
comparing datapoints that measure actual performance of a database in the plurality of databases to datapoints of the generated baseline prediction for the database in the plurality of databases;
comparing actual performance datapoints of the database in the plurality of databases to datapoints associated with respective baseline predictions of each remaining databases in the plurality of databases using the dimension reduction algorithm;
comparing actual performance datapoints of the database in the plurality of databases to datapoints associated with respective actual performance datapoints of each remaining database in the plurality of the databases using the dimension reduction algorithm; and
measuring a difference in actual performance datapoints to respective datapoints of the generated baseline prediction for each database in the plurality of databases.

3. The computer-implemented method of claim 1, wherein linking one or more databases in the plurality of databases based on the measured difference within the generated linkage matrix reaching the predetermined threshold of measured performance comprises:
linking non-common performance features from one database in the plurality of databases to another database in the plurality, wherein linking non-common performance features comprises:
comparing each measured difference between predicted performance and actual performance from one database in the plurality to a respective measured difference in each remaining database in the plurality,
evaluating whether each measured difference between predicted performance and actual performance for a performance feature reaches a threshold requirement for performance, and
linking at least one feature of the one database to the another database in the plurality of databases that reaches the threshold requirement for performance.

4. The computer-implemented method of claim 1, wherein generating the linkage matrix using the dimension reduction algorithm in the equal-dimensional feature space based on a measured difference between actual performance datapoints of each respective database and respective datapoints associated with the generated baseline prediction for each database in the plurality of databases comprises:
determining a Euclidean distance between a first datapoint of a first database in the plurality of databases and a second datapoint of a second database in the plurality of databases, wherein the Euclidean distance is a square root of a sum function of the first datapoint of the first database in the plurality of databases minus the second datapoint of the second database in the plurality of databases squared.

5. The computer-implemented method of claim 3, further comprising:
in response to determining that the measured difference between predicted performance and actual performance for the performance feature does not reach the threshold requirement for performance, concatenating actual performance datapoints of each respective database in the plurality of databases in combination with datapoints of each respective database in the plurality of databases associated with the generated baseline prediction for each database in the plurality of databases.

6. The computer-implemented method of claim 1, further comprising:
measuring performance improvement of the one or more linked databases; and
measuring effects of remaining features not previously measured based on the performance improvement of measured features within the one or more linked databases.

7. The computer-implemented method of claim 1, wherein generating a design using the linked databases for a computer system capable of being displayed through a user interface comprises:
receiving input from haptic sensors of a computing device for a linked database in the plurality of databases;
generating a design for a first computer system based on received input from haptic sensors of a computing device;
modifying the generated design for the first computer system based on received input from haptic sensors of the computing device;
optimizing the generated design for the first computer system based on the modified, generated design for the first computer system;
displaying the optimized, generated design for the first computer system based on a combination of the modified design, received input from haptic sensors of the computing device, and the linked database; and
building a second computing system based on an optimized design of the computer system capable of being displayed through the user interface.

8. A computer program product comprising:
one or more computer readable storage media and program instructions stored on the one or more computer readable storage media, the program instructions comprising:
program instructions to generate a baseline prediction for each database in a plurality of databases, wherein the generated baseline prediction includes datapoints for each performance feature of a respective database in the plurality of databases;
program instructions to generate a linkage matrix using a dimension reduction algorithm in an equal-dimensional feature space based on a measured difference between actual performance datapoints of each respective database and respective datapoints associated with the generated baseline prediction for each database in the plurality of databases;
program instructions to link one or more databases in the plurality of databases based on the measured difference within the generated linkage matrix reaching a predetermined threshold of measured performance; and
program instructions to generate a design using the linked databases for a computer system capable of being displayed through a user interface.

9. The computer program product of claim 8, wherein the program instructions to generate the linkage matrix using the dimension reduction algorithm in the equal-dimensional feature space based on a measured difference in actual performance datapoints to datapoints of the generated baseline prediction for each database in the plurality of databases comprise:
program instructions to compare datapoints that measure actual performance of a database in the plurality of databases to datapoints of the generated baseline prediction for the database in the plurality of databases;
program instructions to compare actual performance datapoints of the database in the plurality of databases to datapoints associated with respective baseline predictions of each remaining databases in the plurality of databases using the dimension reduction algorithm;
program instructions to compare actual performance datapoints of the database in the plurality of databases to datapoints associated with respective actual performance datapoints of each remaining database in the plurality of the databases using the dimension reduction algorithm; and
program instructions to measure a difference in actual performance datapoints to respective datapoints of the generated baseline prediction for each database in the plurality of databases.

10. The computer program product of claim 8, wherein the program instructions to link one or more databases in the plurality of databases based on the measured difference within the generated linkage matrix reaching the predetermined threshold of measured performance comprise:
program instructions to link non-common performance features from one database in the plurality of databases to another database in the plurality, wherein linking non-common performance features comprises:
program instructions to compare each measured difference between predicted performance and actual performance from one database in the plurality to a respective measured difference in each remaining database in the plurality,
program instructions to evaluate whether each measured difference between predicted performance and actual performance for a performance feature reaches a threshold requirement for performance, and
program instructions to link at least one feature of the one database to the another database in the plurality of databases that reaches the threshold requirement for performance.

11. The computer program product of claim 8, wherein the program instructions to generate the linkage matrix using the dimension reduction algorithm in the equal-dimensional feature space based on a measured difference between actual performance datapoints of each respective database and respective datapoints associated with the generated baseline prediction for each database in the plurality of databases comprises:
program instructions to determine a Euclidean distance between a first datapoint of a first database in the plurality of databases and a second datapoint of a second database in the plurality of databases, wherein the Euclidean distance is a square root of a sum function of the first datapoint of the first database in the plurality of databases minus the second datapoint of the second database in the plurality of databases squared.

12. The computer-implemented method of claim 10, wherein the program instructions stored on the one or more computer readable storage media further comprise:
in response to program instructions to determine that the measured difference between predicted performance and actual performance for the performance feature does not reach the threshold requirement for performance, program instructions to concatenate actual performance datapoints of each respective database in the plurality of databases in combination with datapoints of each respective database in the plurality of databases associated with the generated baseline prediction for each database in the plurality of databases.

13. The computer program product of claim 8, wherein the program instructions stored on the one or more computer readable storage media further comprise:
program instructions to measure performance improvement of the one or more linked databases; and
program instructions to measure effects of remaining features not previously measured based on the performance improvement of measured features within the one or more linked databases.

14. The computer program product of claim 8, wherein the program instructions to generate a design using the linked databases for a computer system capable of being displayed through a user interface comprise:
program instructions to receive input from haptic sensors of a computing device for a linked database in the plurality of databases;
program instructions to generate a design for a first computer system based on received input from haptic sensors of a computing device;
program instructions to modify the generated design for the first computer system based on received input from haptic sensors of the computing device;
program instructions to optimize the generated design for the first computer system based on the modified, generated design for the first computer system;
program instructions to display the optimized, generated design for the first computer system based on a combination of the modified design, received input from haptic sensors of the computing device, and the linked database; and program instructions to build a second computing system based on an optimized design of the computer system capable of being displayed through the user interface.

15. A computer system comprising:
one or more computer processors;
one or more computer readable storage media; and
program instructions stored on the one or more computer readable storage media for execution by at least one of the one or more processors, the program instructions comprising:
program instructions to generate a baseline prediction for each database in a plurality of databases, wherein the generated baseline prediction includes datapoints for each performance feature of a respective database in the plurality of databases;
program instructions to generate a linkage matrix using a dimension reduction algorithm in an equal-dimensional feature space based on a measured difference between actual performance datapoints of each respective database and respective datapoints associated with the generated baseline prediction for each database in the plurality of databases;
program instructions to link one or more databases in the plurality of databases based on the measured difference within the generated linkage matrix reaching a predetermined threshold of measured performance; and
program instructions to generate a design using the linked databases for a computer system capable of being displayed through a user interface.

16. The computer system of claim 15, wherein the program instructions to generate the linkage matrix using the dimension reduction algorithm in the equal-dimensional feature space based on a measured difference in actual performance datapoints to datapoints of the generated baseline prediction for each database in the plurality of databases comprise:
program instructions to compare datapoints that measure actual performance of a database in the plurality of databases to datapoints of the generated baseline prediction for the database in the plurality of databases;
program instructions to compare actual performance datapoints of the database in the plurality of databases to datapoints associated with respective baseline predictions of each remaining databases in the plurality of databases using the dimension reduction algorithm;
program instructions to compare actual performance datapoints of the database in the plurality of databases to datapoints associated with respective actual performance datapoints of each remaining database in the plurality of the databases using the dimension reduction algorithm; and
program instructions to measure a difference in actual performance datapoints to respective datapoints of the generated baseline prediction for each database in the plurality of databases.

17. The computer system of claim 15, wherein the program instructions to link one or more databases in the plurality of databases based on the measured difference within the generated linkage matrix reaching the predetermined threshold of measured performance comprise:
program instructions to link non-common performance features from one database in the plurality of databases to another database in the plurality, wherein linking non-common performance features comprise:
program instructions to compare each measured difference between predicted performance and actual performance from one database in the plurality to a respective measured difference in each remaining database in the plurality,
program instructions to evaluate whether each measured difference between predicted performance and actual performance for a performance feature reaches a threshold requirement for performance, and
program instructions to link at least one feature of the one database to the another database in the plurality of databases that reaches the threshold requirement for performance.

18. The computer system of claim 15, wherein the program instructions to generate the linkage matrix using the dimension reduction algorithm in the equal-dimensional feature space based on a measured difference between actual performance datapoints of each respective database and respective datapoints associated with the generated baseline prediction for each database in the plurality of databases comprise:
program instructions to determine a Euclidean distance between a first datapoint of a first database in the plurality of databases and a second datapoint of a second database in the plurality of databases, wherein the Euclidean distance is a square root of a sum function of the first datapoint of the first database in the plurality of databases minus the second datapoint of the second database in the plurality of databases squared.

19. The computer system of claim 17, wherein the program instructions stored on the one or more computer readable storage media further comprise:
in response to program instructions to determine that the measured difference between predicted performance and actual performance for the performance feature does not reach the threshold requirement for performance, program instructions to concatenate actual performance datapoints of each respective database in the plurality of databases in combination with datapoints of each respective database in the plurality of databases associated with the generated baseline prediction for each database in the plurality of databases.

20. The computer system of claim 15, wherein the program instructions stored on the one or more computer readable storage media further comprise:
program instructions to measure performance improvement of the one or more linked databases; and
program instructions to measure effects of remaining features not previously measured based on the performance improvement of measured features within the one or more linked databases.

* * * * *